(12) United States Patent
Li et al.

(10) Patent No.: US 7,903,865 B2
(45) Date of Patent: Mar. 8, 2011

(54) AUTOMATIC OPTICAL INSPECTION SYSTEM AND METHOD

(75) Inventors: Wei-Chen Li, Hsinchu (TW); Yih-Chih Chiou, Hsinchu (TW)

(73) Assignee: Chuang Hwa University, Hsinchu (TW)

( * ) Notice: Subject to any disclaimer, the term of this patent is extended or adjusted under 35 U.S.C. 154(b) by 1015 days.

(21) Appl. No.: 11/727,568

(22) Filed: Mar. 27, 2007

(65) Prior Publication Data
US 2008/0240541 A1    Oct. 2, 2008

(51) Int. Cl.
*G06K 9/00* (2006.01)
*G06K 9/68* (2006.01)

(52) U.S. Cl. .................... 382/141; 382/218; 382/219

(58) Field of Classification Search .................... 382/141
See application file for complete search history.

(56) References Cited

U.S. PATENT DOCUMENTS

| | | | | |
|---|---|---|---|---|
| 4,584,469 A | * | 4/1986 | Lovalenti | 250/223 B |
| 4,884,696 A | * | 12/1989 | Peleg | 209/545 |
| 5,432,862 A | * | 7/1995 | Hirsch | 382/207 |
| 5,548,326 A | * | 8/1996 | Michael | 348/87 |
| 5,850,466 A | * | 12/1998 | Schott | 382/141 |
| 6,024,018 A | * | 2/2000 | Darel et al. | 101/365 |
| 6,169,600 B1 | * | 1/2001 | Ludlow | 356/237.1 |
| 6,516,083 B1 | * | 2/2003 | Bonechi et al. | 382/141 |
| 6,950,547 B2 | * | 9/2005 | Floeder et al. | 382/143 |
| 7,092,571 B2 | * | 8/2006 | Hsieh | 382/209 |
| 7,400,759 B2 | * | 7/2008 | Cormier et al. | 382/141 |
| 7,619,646 B2 | * | 11/2009 | Freifeld et al. | 348/85 |
| 2007/0230768 A1 | * | 10/2007 | Adler et al. | 382/144 |
| 2008/0069446 A1 | * | 3/2008 | Ancelin | 382/181 |
| 2009/0043374 A1 | * | 2/2009 | Nakano | 623/1.15 |

FOREIGN PATENT DOCUMENTS

| | | | |
|---|---|---|---|
| JP | 11044650 A | * | 2/1999 |
| JP | 2003207458 A | * | 7/2003 |

OTHER PUBLICATIONS

Machine Translation of JP 11044650.*

* cited by examiner

*Primary Examiner* — Aaron W Carter
*Assistant Examiner* — Utpal Shah
(74) *Attorney, Agent, or Firm* — Rosenberg, Klein & Lee

(57) ABSTRACT

An automatic optical inspection system includes a rotary device for driving an object to rotate. At least one line-scan camera is implemented for generating two-dimensional planar images of cylindrical surfaces of the object. A device for detecting defects is operable to generate the two-dimensional planar images of the cylindrical surfaces of the object according to a normalized grayscale absolute difference inspection method.

15 Claims, 7 Drawing Sheets

AUTOMATIC OPTICAL INSPECTION SYSTEM AND METHOD

BACKGROUND OF THE INVENTION

1. Field of the Invention

The present invention relates to an automatic optical inspection system and method, and particularly to an automatic optical inspection system and method using line scan cameras.

2. Description of the Related Art

The quality of sealing elements signifies whether the manufacturer has grasped the core technology and quality control capability. During inject-molding of sealing elements, the variation in pressure or temperature might bring about defects. However, the final quality control is still undertaken manually at present.

Thus, it can be seen in a modern production line that tens or even hundreds of workers should execute quality control tasks manually. In spite of so much manpower have been expended, it is still unlikely to detect all defective products. In the competitive environment nowadays, even a defective fraction of one thousandth is unacceptable. The quality control of sealing elements needs to perform small dimension measurements, shape comparisons and color recognitions fast and accurately. However, those tasks are hard to stably be executed with human eyes continuously. Further, tired human eyes could miss sometimes. Besides, the subjective judgment of each individual brings about the diversity of the quality control standard.

Sealing elements, such as packings, oil seals, and gaskets are devices to prevent rotating equipment such as pumps and compressors from leaking. They are usually made of rubber and PU (polyurethane). In the conventional manual inspection operation, high intensity light is used to illuminate sealing elements, and the optical refractions caused by a defect will reveal the defect itself. However, such an inspection method not only cause injuries to eyesights but also high in cost. In other words, experienced operators have to find and classify defects with naked eyes in the conventional inspection method. Tiredness and other factors will make even the most experienced inspectors fail to find defects sometimes. Besides, the inspection speeds of the inspectors are not always the same. Therefore, the conventional manual inspection method is expensive, unreliable and hard to meet the requirement of a modern production line.

The machine vision-based inspection technology is a promising solution to the problems of the conventional manual inspection method. A conventional technology proposed a scheme to capture and inspect the image of defects of the top and bottom surfaces of a sealing element. However, this technology does not provide the inspection of the inner and outer cylindrical surfaces of the sealing element, which are often the critical portions of a sealing element. A defect in the inner or outer cylindrical surfaces, such as a scratch or a blister, may make a hydraulic system or a reciprocating shaft system, which uses a lot of sealing elements, unable to operate. Moreover, the conventional technology cannot deal with the inspection of cylindrical surfaces because it utilizes an area-scan camera to capture the image of a curved surface. An area-scan camera acquires image of the curved surface not in a single shot but section by section in a plurality of shots. Such an approach is thus time-consuming. Besides, when a large-area curved surface is projected into a 2D plane, the image will be distorted. Although the conventional machine vision-based inspection technology is more accurate than the conventional manual inspection method, there is still room to improve.

Accordingly, the present invention provides an automatic optical inspection system and method to overcome the above-mentioned problems and promote the accuracy of defect inspection.

SUMMARY OF THE INVENTION

An automatic optical inspection system includes a rotary device for driving an object to rotate. At least one line-scan camera is implemented for generating two-dimensional planar images of cylindrical surfaces of the object. A device for detecting defects is operable to generate the two-dimensional planar images of the cylindrical surfaces of the object according to a normalized grayscale absolute difference inspection method.

The present invention proposes an automatic optical inspection method. First, two two-dimensional test images of the inner and outer cylindrical surfaces of an object are captured by two line-scan cameras, respectively. The images are then pre-processed to remove background from the images. The resulting images can be used for detecting defects according to a normalized grayscale absolute difference inspection method. Finally, blob analysis technique is used to verify the detected defects.

The present invention utilizes machine vision technologies to develop an automatic optical inspection system to solve the problems in the conventional manual inspection, thereby preventing damages to an expensive hydraulic/pneumatic machine.

PREFERRED EMBODIMENTS OF THE INVENTION

Figure 1:
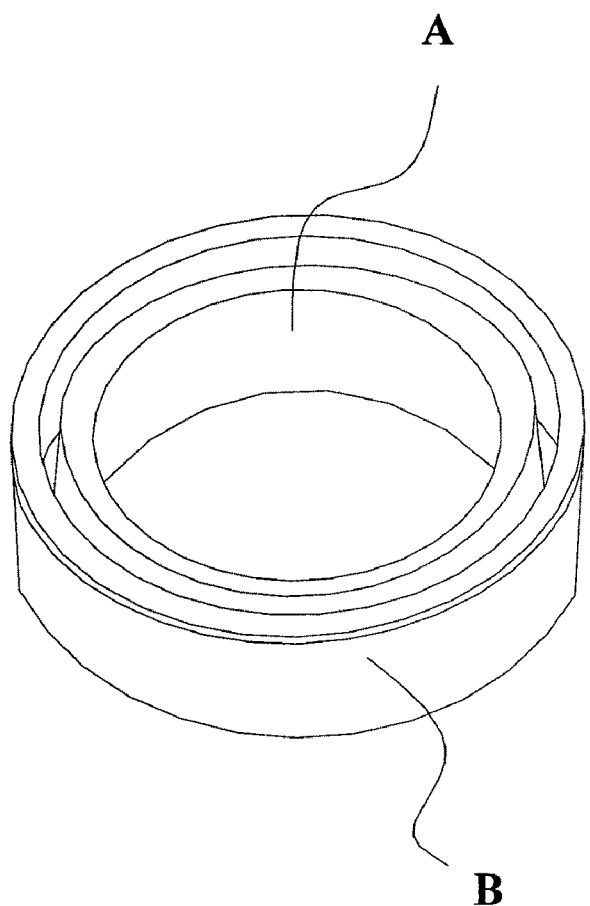
FIG. 1 is a diagram schematically showing the sealing element used in the preferred embodiment of the present invention.
Figure 2:
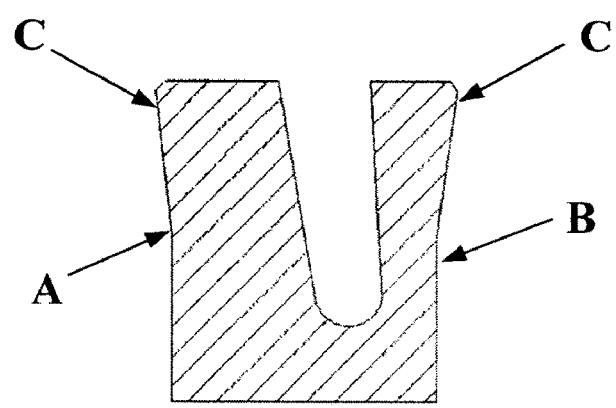
FIG. 2 is the cross section of the sealing element used in the preferred embodiment of the present invention.

A sealing element is annular packing and made of polyurethane (PU), which is a translucent material. As a sealing element has a plurality of surfaces, the images of different surfaces are usually captured using different equipments and methods. In particular, capturing the images of the cylindrical surfaces of the sealing element is very challenging. FIG. 1 is an example of a sealing element applied by a preferred embodiment of the present invention. Referring to FIG. 1 and FIG. 2, the circular PU-packing has the inner cylindrical surface A and the outer cylindrical surfaces B. The defects to be inspected include, for instance, distortions, burrs, interstices, blisters, inclusions, scratches and air bubbles.

Figure 3:
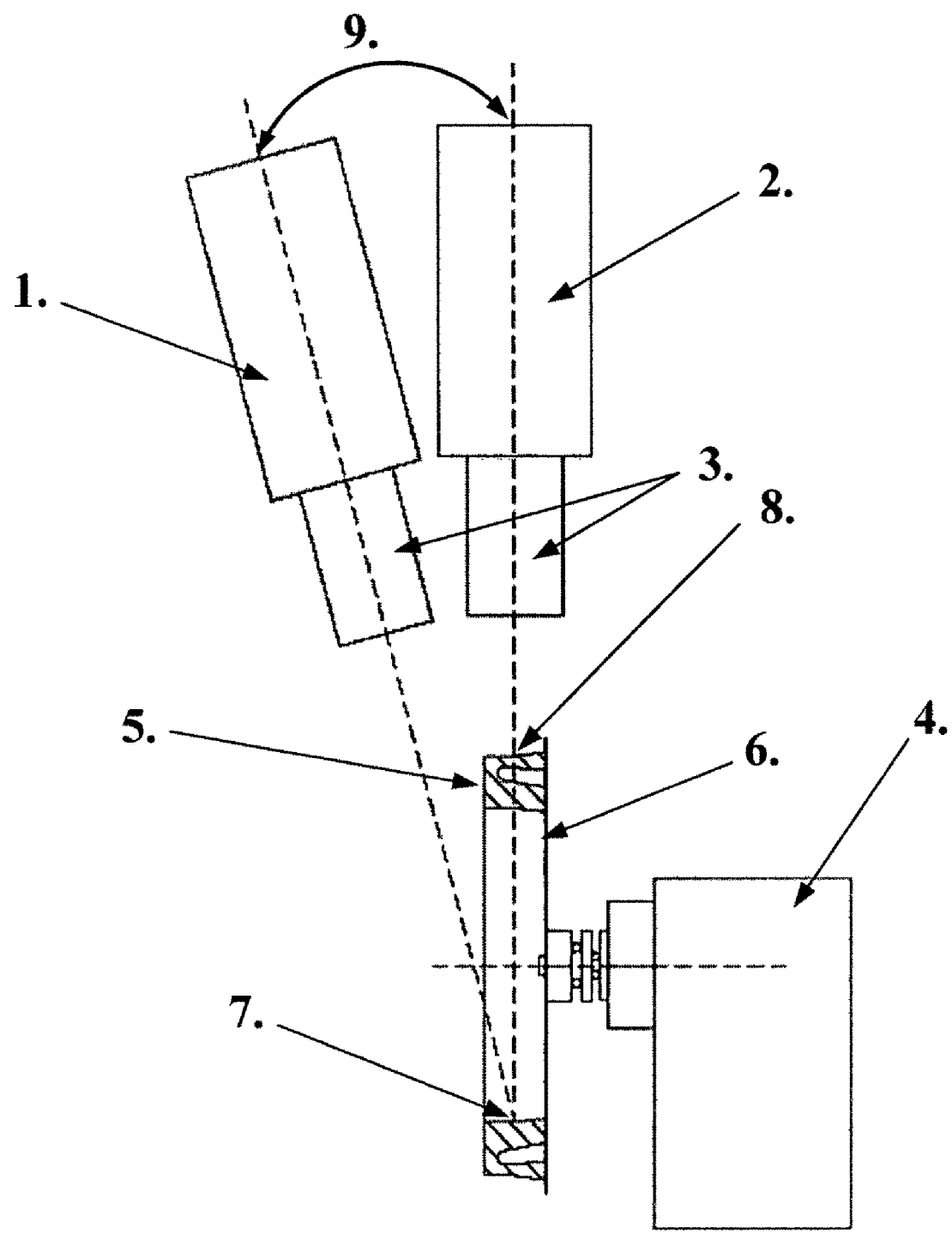
FIG. 3 is a diagram schematically showing the cylindrical surface inspection system according to the present invention.

FIG. 3 is a schematic diagram showing the inner and outer cylindrical surface inspection system according to the present invention. The system includes a rotary device 4 for rotating the sealing element 5 to various circular positions. It also includes at least one line-scan camera 1 for capturing the images of inner and outer surfaces 7 and 8 of the sealing element 5. In this preferred embodiment of the invention, two line-scan cameras 1 and 2 with lenses 3 were used, and arranged with an included angle 9 in between as shown in FIG. 3. The best included angle 9 is about 10 to 20 degrees. A sealing element 5 to be inspected is fixed onto a rotary disc 6.

The sampling frequency of the line-scan cameras 1 and 2 is equal to the vertical resolution divided by the sampling time. For example, if the required sampling time is 0.18 seconds, the motor 4 should have a rotation speed of 333 rpm.

Figure 4:
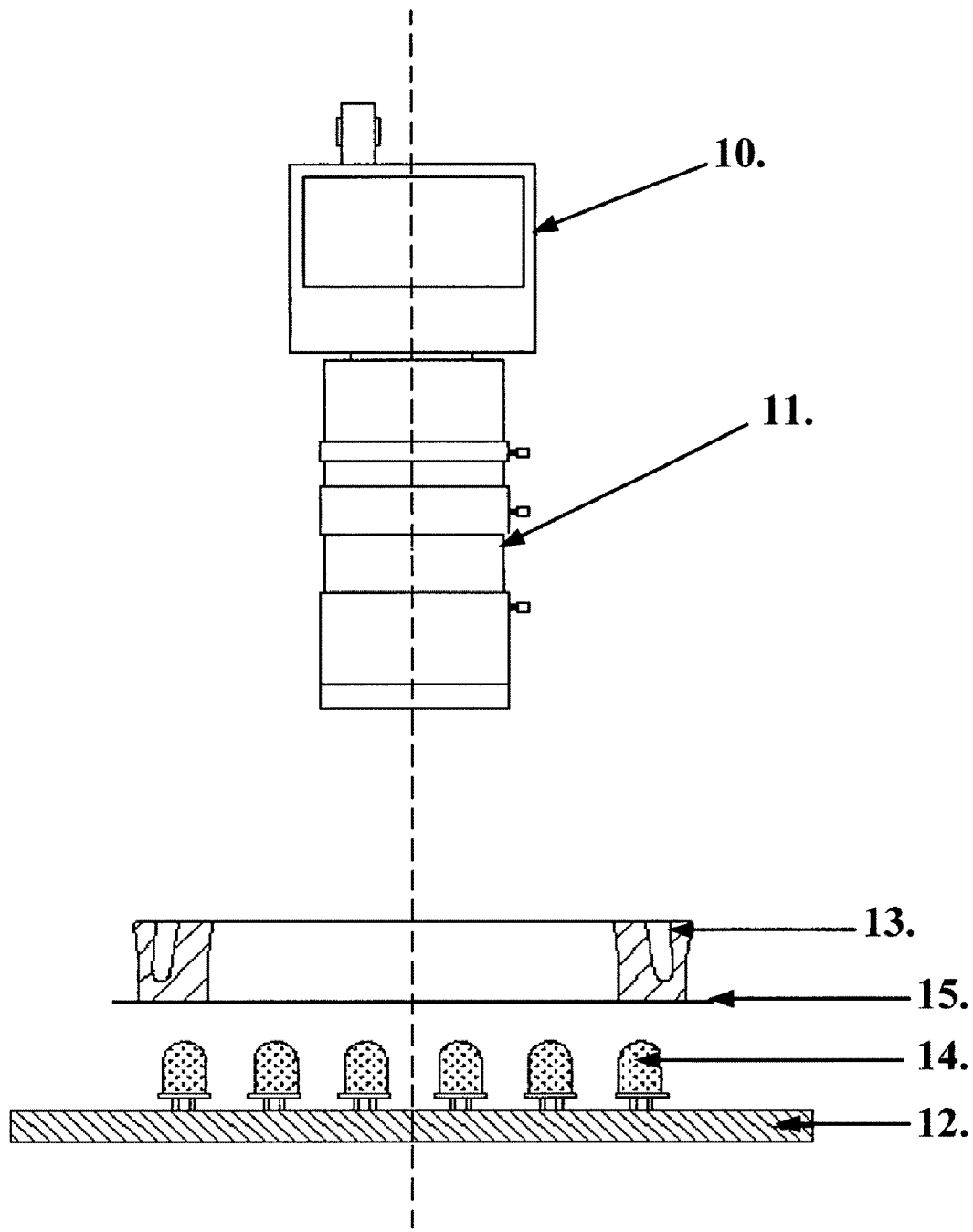
FIG. 4 is a diagram schematically showing the interior inspection system according to the present invention.

The automatic optical inspection system of the present invention also includes an interior inspection system as shown in FIG. 4. The interior inspection system consists of at least one surface-scan camera 10 with lens 11 for scanning the interior of sealing element for inclusions and air bubbles. The interior inspection device as shown in FIG. 4 used by the present invention is cooperating with an infrared LED backlight plate 12 to capture and inspect the image of the interior of the sealing element 13 for defects. The infrared LED backlight plate 12 consisting of multiple matrix-type infrared LEDs 14 provides uniform illumination by passing a diffuser 15.

Figure 5:
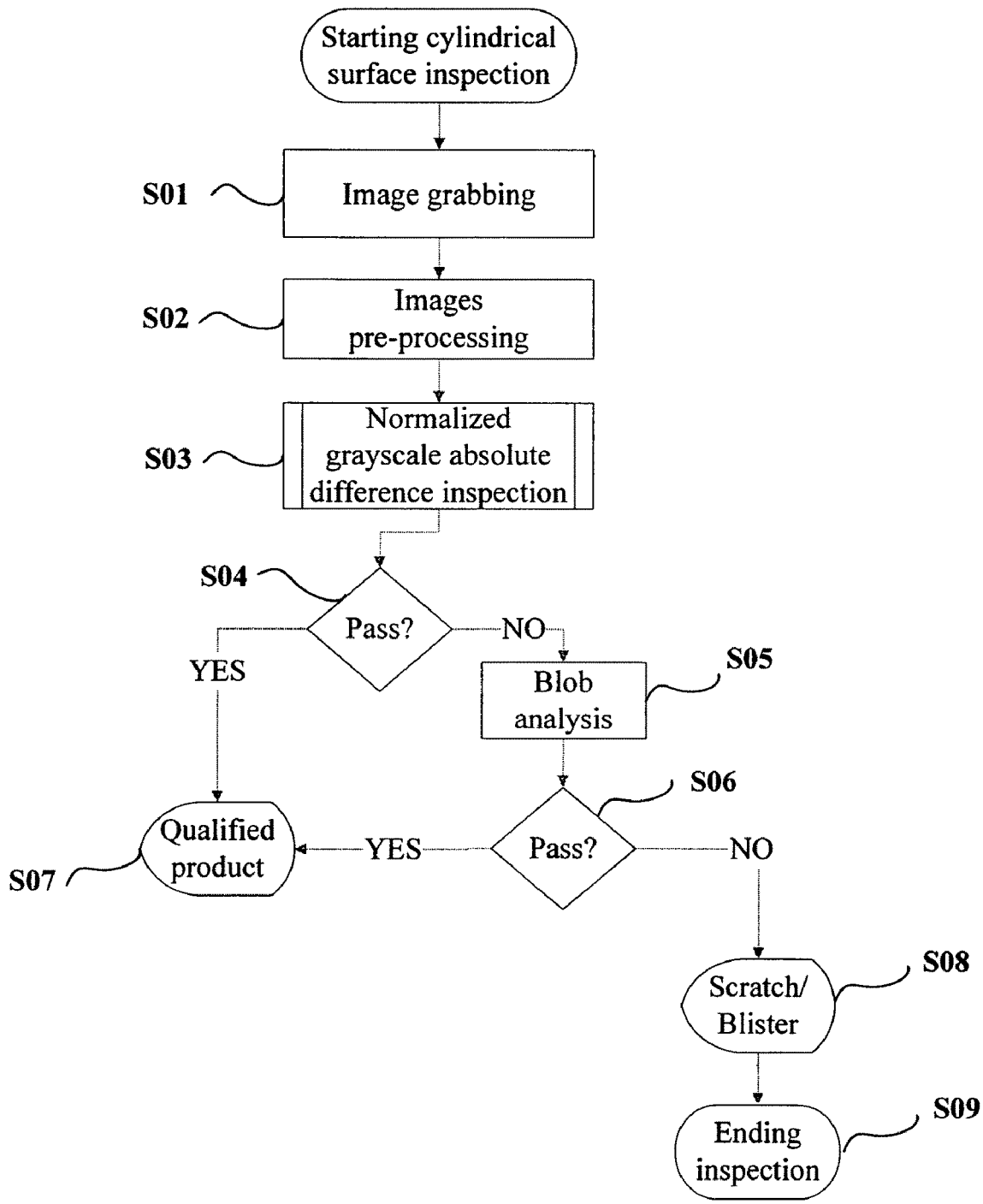
FIG. 5 is a flowchart of cylindrical surface inspection method according to the present invention.
Figure 6:
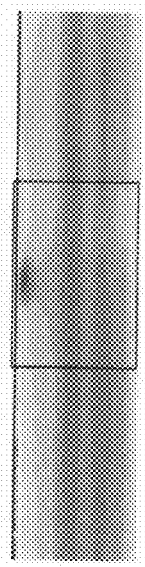
FIG. 6 is a diagram showing a partial image strip of a packing.
Figure 7:
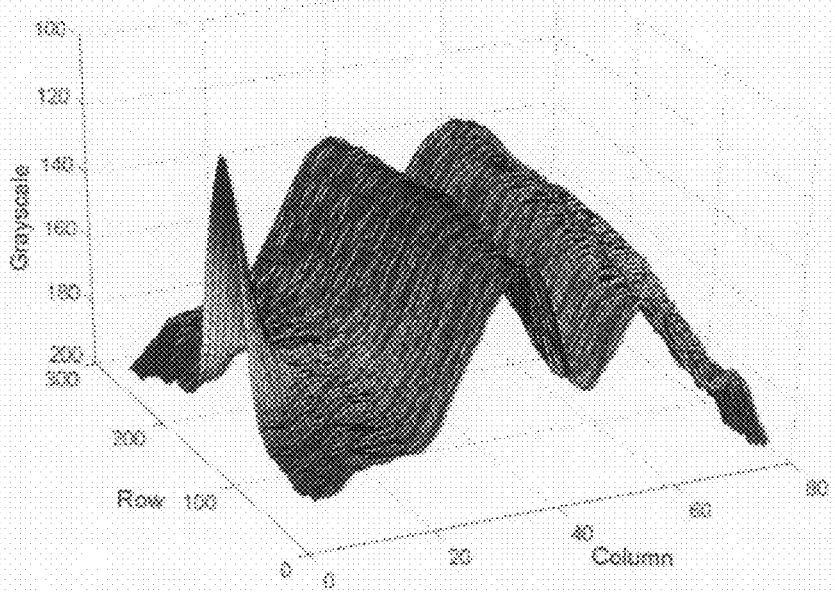
FIG. 7 is a diagram showing the grayscale distribution of the image strip as shown in FIG. 6.

FIG. 5 is a flowchart showing the method of cylindrical surface inspection according to the present invention. In Step S01, two line-scan cameras are used to simultaneously capture images of the inner and outer cylindrical surfaces of a sealing element line by line while rotating the sealing element. The images captured will be m×n pictures where m and n denote the width and height of the test images respectively. In Step S02, the captured images are pre-processed with a low-pass filter to remove noises and then binarized. FIG. 6 shows an example of image strip of a packing wherein the black spot within the rectangle indicates the possible defect. The grayscale distribution of the portion of the image enclosed by the rectangle is shown in FIG. 7. The image will be analyzed using the following steps.

Figure 8:
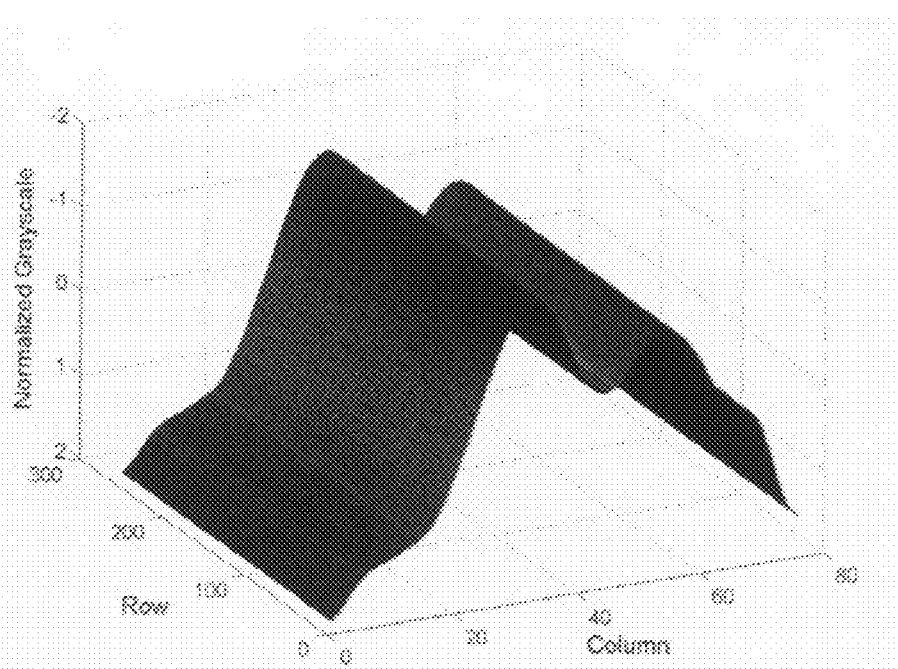
FIG. 8 is a diagram showing an example of a normalized reference image.
Figure 9:
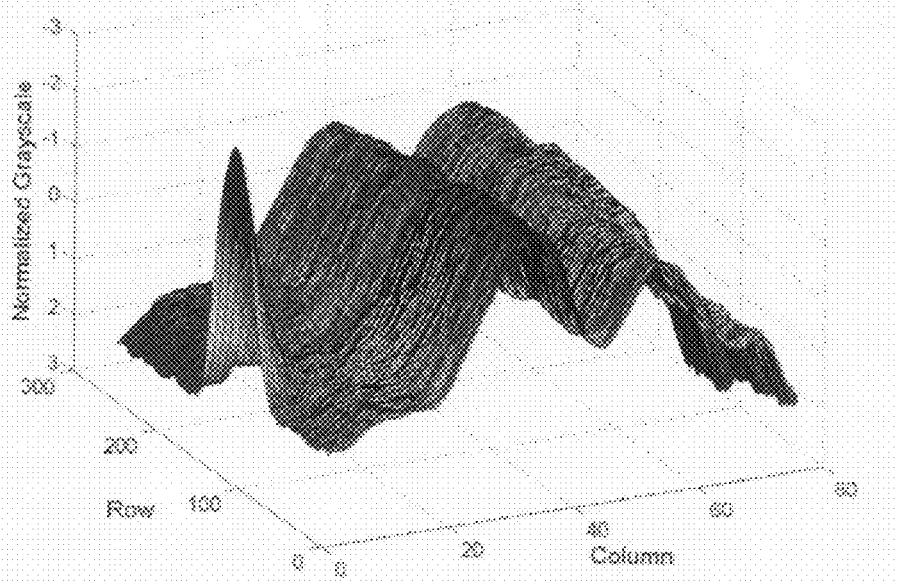
FIG. 9 is a diagram showing an example of a normalized grayscale image.

In Step S03 and Step S04, a normalized grayscale absolute difference inspection method is used to reveal defects. After performing these two steps, the system will generate a normalized reference image as shown in FIG. 8 and a normalized grayscale image as shown in FIG. 9 from the image as shown in FIG. 7.

The process of generating the normalized reference image consists of the following steps. First, calculate the grayscale mean for each column ($\mu_{col}$) of the test image by using the equation (1) below, $$\mu_{col}(i) = \frac{1}{n}\sum_{j=1}^{n} f(i, j); i = 1, m \qquad (1)$$

wherein (i,j) is the pixel location of the m×n test image.

Then, apply equation (2) to calculate the grayscale mean ($\mu$) of the test image:

$$\mu = \frac{1}{m}\sum_{k=1}^{m} \mu_{col}(k). \qquad (2)$$

Then, apply equation (3) to obtain the standard deviation ($\sigma_{col}$) of the grayscale means of the m columns of the test image:

$$\sigma_{col} = \sqrt{\frac{1}{m}\sum_{i=1}^{m}(\mu_{col}(i) - \mu)^2}. \qquad (3)$$

Finally, the normalized reference image (NRI (i,j)) can be obtained by subtracting the grayscale mean of the test image from the grayscale mean of each column, and dividing the result by the standard deviation of the grayscale means of the m columns as shown by the equation (4), $$NRI(i, j) = \frac{\mu_{Col}(i) - \mu}{\sigma_{col}}; \qquad (4)$$

$$i = 1, m;$$

$$j = 1, n.$$

The process of generating the normalized grayscale image is similar to the process of generating the normalized reference image. First, apply equation (5) to obtain the grayscale mean for each row of the image ($\mu_{row}(j)$), $$\mu_{row}(j) = \frac{1}{m}\sum_{i=1}^{m} f(i, j); \qquad (5)$$

$$j = 1, n.$$

wherein (i,j) is the pixel location of the m×n test image.

Then, apply equation (6) to derive the standard deviation of the grayscale means of the n rows σ of the test image, $$\sigma_{row} = \sqrt{\frac{1}{n}\sum_{j=1}^{n}(\mu_{row}(j) - \mu)^2}. \qquad (6)$$

Each pixel's normalized gray level N(i,j) (and thus the normalized grayscale image) can be obtained by dividing the difference between the each pixel's gray level and the grayscale mean of the corresponding row by the standard deviation of the corresponding row as shown by equation (7), $$N(i, j) = \frac{f(i, j) - \mu_{row}(j)}{\sigma_{row}(j)}. \qquad (7)$$

Figure 10:
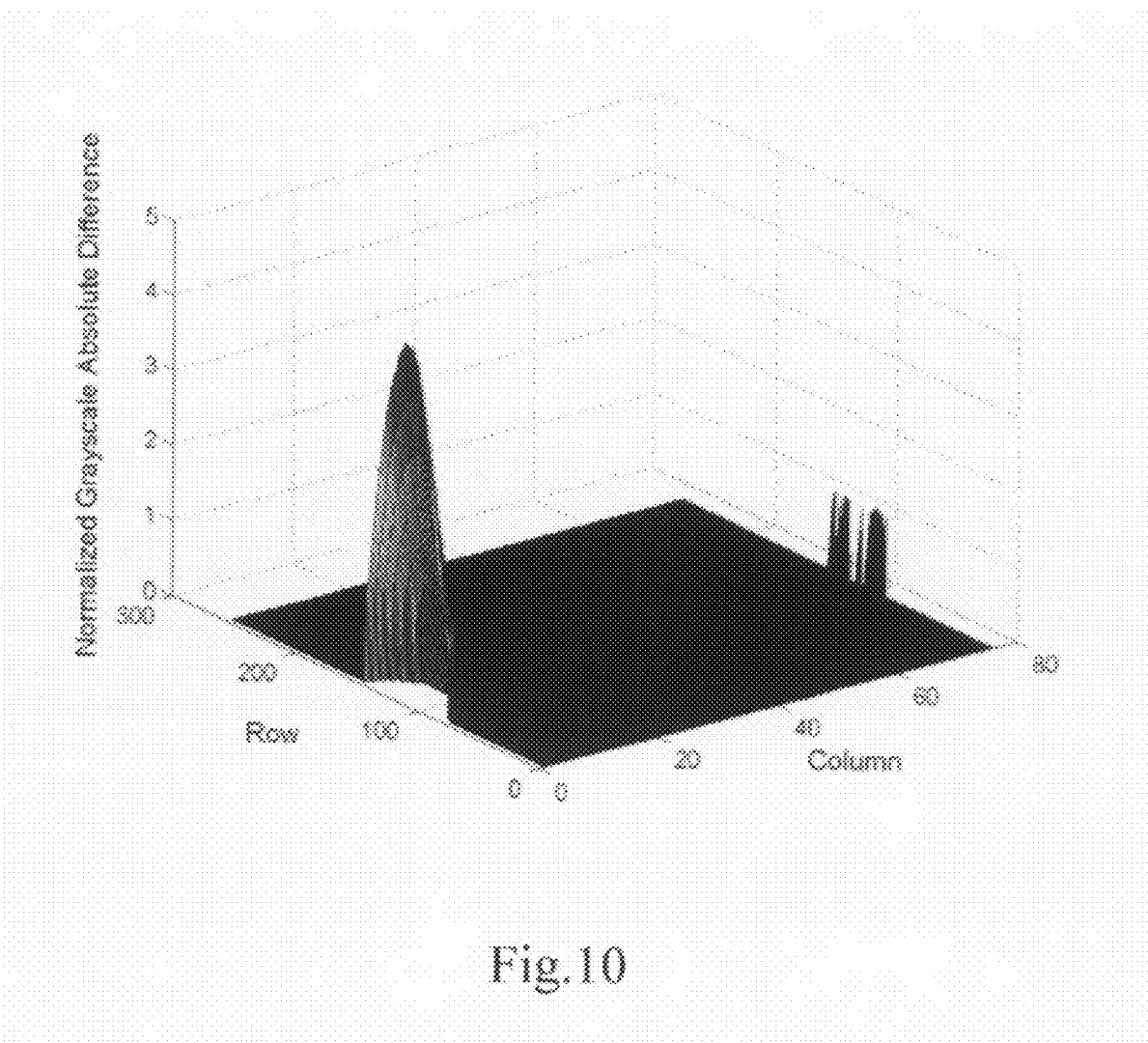
FIG. 10 is a diagram showing an example of an absolute difference image between the normalized grayscale image shown in FIG. 9 and the normalized reference image as shown in FIG. 8.

A normalized grayscale absolute difference image as shown in FIG. 10 can then be obtained by subtracting the normalized reference image as shown in FIG. 8 from the normalized grayscale image as shown in FIG. 9. Finally, each pixel of the normalized grayscale absolute difference image as shown in FIG. 10 is compared with a pre-determined threshold value to reveal the abnormal pixels of the captured image. The abnormal pixels indicate the possible defects on the sealing element.

If the normalized grayscale absolute difference inspection method does not detect any scratch or blister, the sealing element passes the test and is determined to be a qualified product in Step S07.

If the sealing element does not pass the examination of the normalized grayscale absolute difference inspection method, Step S05 and Step S06 are subsequently performed. The blob analysis technique is applied to verify whether scratches or blisters indeed exist.

If Step S06 determines that none of the defects exists, the sealing element is determined to be a qualified product in Step S07.

If Step S06 determines that a scratch or a blister exists, the sealing element is determined to be a defective product in Step S08. Therefore, the inspection ends in Step S09.

Referring to FIG. 2, the lip portion C of the sealing element is slightly inclined; therefore, the line-scan camera 2 is tilted about 5 degrees to make the scan line parallel the inclined surface during the process of capturing the image of the external cylindrical surface. In capturing the image of the internal cylindrical surface, the unnecessary image of the top surface is also captured. Therefore, the pre-processing technique of Step S02 is used to trim the inspected region. It is preferred that two line-scan cameras are separated by a 15-degree angle. Besides, an optical fiber illuminator may be used to illuminate the scan line. The incident light has an angle of about 20 to 30 degrees with respect to the normal of the scanned surface and generates a illumination of between 5000 and 10000 Lux.

In summary, the present invention proposes an automatic optical inspection system to replace the conventional manual inspection method for inspecting sealing elements. The present invention can inspect sealing elements. In addition, the present invention may be widely applied to the plastic inject-molding and the chemical industries. The present invention uses a line-scan camera to capture the image of the cylindrical surface, and uses a dedicated infrared backlight plate to illuminate PU-packing. Based on the characteristic of the shape of the PU-packing—a cylindrical structure, the present invention can transform a 3D curved surface into a 2D image with a line-scan camera and a revolution movement. Based on the semi-transparency of PU material and the penetrability of infrared light, the present invention adopts an infrared backlight plate to illuminate the PU-packing and reveal the defects in the arc region of the recess of the sealing element. Furthermore, the present invention utilizes computerized image processing techniques to analyze the image and detect defects.

Those described above are the preferred embodiments to exemplify the present invention. However, it is not intended to limit the scope of the present invention. Any equivalent modification or variation according to the spirit of the present invention is to be also included within the scope of the present invention.

What is claimed is:

1. An automatic optical inspection system comprising:
a rotary device for driving an object to rotate;
at least one line-scan camera for generating two-dimensional planar images of cylindrical surfaces of the object;
means for detecting defects of the two-dimensional planar images of the cylindrical surfaces of the object according to a normalized grayscale absolute difference inspection method and generating a defect determination signal; and
a recess inspection device cooperating with an infrared LED backlight plate to capture and inspect images of the object.

2. The automatic optical inspection system according to claim 1, wherein the cylindrical surfaces of the object comprises an internal cylindrical surface and an external cylindrical surface.

3. The automatic optical inspection system according to claim 1, wherein the object is a sealing element.

4. The automatic optical inspection system according to claim 1, wherein the infrared LED backlight plate comprises:
a plurality of matrix-type infrared LEDs; and
a diffuser on the plurality of matrix-type infrared LEDs to provide uniform illumination.

5. An inspection method comprising:
generating a normalized reference image of a test image;
generating a normalized grayscale image of the test image;
obtaining a normalized grayscale absolute difference image by subtracting the normalized reference image from the normalized grayscale images; and
revealing abnormal pixels of the test image by comparing each pixel of the normalized grayscale absolute difference image with a pre-determined threshold value;
wherein the step of generating the normalized reference image of a captured image comprises:
calculating grayscale mean ($\mu_{col}(i)$) for each column of the test image by the following equation, $$\mu_{col}(i) = \frac{1}{n}\sum_{j=1}^{n} f(i, j)$$

with i=1,m wherein (i,j) is the pixel location of the m×n test image; calculating grayscale mean ($\mu$) of the test image with following equation, $$\mu = \frac{1}{m}\sum_{k=1}^{m} \mu_{col}(k);$$

calculating standard deviation ($\sigma_{col}$) of the grayscale means of the m columns of the test image with following equation, $$\sigma_{col} = \sqrt{\frac{1}{m}\sum_{i=1}^{m}(\mu_{col}(i) - \mu)^2} \text{ ; and}$$

obtaining the normalized reference image (NRI (i,j)) by subtracting the grayscale mean of the test image from the grayscale mean of each column, and dividing the result by the standard deviation of the grayscale means of the m columns with following equation, $$NRI(i, j) = \frac{\mu_{Col}(i) - \mu}{\sigma_{col}} \text{ where } i = 1, m \text{ and } j = 1, n.$$

6. The method as claimed in claim 5, further comprising:
generating the test image by simultaneously capturing the inner and the outer cylindrical surfaces of a sealing element prior to the step of generating the normalized reference image of the test image.

7. The method as claimed in claim 6, further comprising:
obtaining a m×n two-dimensional test image by capturing images of the inner and the outer cylindrical surfaces of the sealing element line by line while rotating the sealing element, wherein m and n denote the width and height of the test image respectively.

8. The method as claimed in claim 7, further comprising: removing background image from the tested image.

9. The method according to claim 5, wherein the step of generating the normalized grayscale image of the test image comprises:
calculating the grayscale mean $\mu_{row}(j)$ for each row of the image by following equation, $$\mu_{row}(j) = \frac{1}{m}\sum_{i=1}^{m} f(i, j) \text{ where } j = 1, n;$$

deriving the standard deviation ($\sigma_{row}$) of the grayscale means of the n rows of the test image with the following equation, $$\sigma_{row} = \sqrt{\frac{1}{n}\sum_{j=1}^{n}(\mu_{row}(j) - \mu)^2} \text{ ; and}$$

obtaining each pixel's normalized gray level N(i,j) (and thus the normalized grayscale image) by dividing the difference between the each pixel's gray level and the grayscale mean of the corresponding row by the standard deviation of the corresponding row with the following equation, $$N(i, j) = \frac{f(i, j) - \mu_{row}(j)}{\sigma_{row}(j)}.$$

10. An automatic optical inspection method comprising the steps of:
capturing m×n two-dimensional test images of the inner and/or outer cylindrical surfaces of an object, wherein m and n denote the width and height of the test images, respectively;
pre-processing the test image to remove background from the test image;
detecting defects of the test image according to a normalized grayscale absolute difference inspection method; and
verifying the detected defects by using blob analysis technique;
wherein the step of generating a normalized reference image of the test images comprises:
calculating grayscale mean of the test image;
calculating grayscale mean for each column of the test image;
calculating standard deviation of the grayscale means of the m columns of the test image; and
obtaining the normalized reference image by subtracting the grayscale mean of the test image from the grayscale mean of each column, and dividing the result by the standard deviation of the grayscale means of the m columns.

11. The automatic optical inspection method according to claim 10, wherein the step of capturing in m×n two-dimensional test images is performed line by line while rotating the sealing element.

12. The automatic optical inspection method according to claim 10, wherein the pre-processing step includes:
a process to remove the background of the test images using a low-pass filter and
a digitization process.

13. The automatic optical inspection method according to claim 10, wherein the normalized grayscale absolute difference inspection method comprises:
generating a normalized reference image of the test image;
generating a normalized grayscale image of the test image;
obtaining a normalized grayscale absolute difference image by subtracting the normalized reference image from the normalized grayscale images; and
revealing abnormal pixels of the test image by comparing each pixel of the normalized grayscale absolute difference image with a pre-determined threshold value.

14. The automatic optical inspection method according to claim 13, wherein the step of generating a normalized grayscale image of the test images further comprises:
calculating the grayscale mean for each row of the image;
calculating the standard deviation of the grayscale means of the n rows of the test image; and
obtaining each pixel's normalized gray level (and thus the normalized grayscale image) by dividing the difference between the each pixel's gray level and the grayscale mean of the corresponding row by the standard deviation of the corresponding row.

15. The automatic optical inspection method according to claim 10, further comprising:
capturing m×n two-dimensional test images of the interior of the object; and
capturing m×n two-dimensional test images of the recesses of the object.

* * * * *